US012106397B2

(12) United States Patent
Oetting et al.

(10) Patent No.: US 12,106,397 B2
(45) Date of Patent: *Oct. 1, 2024

(54) POLICY DEFINITION AND ENFORCEMENT FOR EXTENDED REALITY MEDIA SESSIONS

(71) Applicants: AT&T Intellectual Property I, L.P., Atlanta, GA (US); AT&T Mobility II LLC, Atlanta, GA (US)

(72) Inventors: John Oetting, Zionsville, PA (US); Eric Zavesky, Austin, TX (US); James Pratt, Round Rock, TX (US); Jason Decuir, Cedar Park, TX (US); Terrel Lecesne, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/053,369

(22) Filed: Nov. 7, 2022

(65) Prior Publication Data
US 2023/0079099 A1 Mar. 16, 2023

Related U.S. Application Data

(63) Continuation of application No. 16/937,675, filed on Jul. 24, 2020, now Pat. No. 11,494,951.

(51) Int. Cl.
G06T 11/00 (2006.01)
G06F 16/9535 (2019.01)
H04L 9/40 (2022.01)

(52) U.S. Cl.
CPC .......... *G06T 11/00* (2013.01); *G06F 16/9535* (2019.01); *H04L 63/102* (2013.01); *H04L 63/20* (2013.01)

(58) Field of Classification Search
CPC .............................. G06T 11/00; G06T 19/006
See application file for complete search history.

(56) References Cited

U.S. PATENT DOCUMENTS

| 10,922,534 B2 | 2/2021 | Zavesky et al. |
| 11,062,678 B2 | 7/2021 | Zavesky et al. |
| 11,182,965 B2 | 11/2021 | Zavesky et al. |
| 2012/0218297 A1 | 8/2012 | Ur |
| 2017/0162177 A1 | 6/2017 | Lebeck et al. |
| 2017/0244951 A1 | 8/2017 | Ha et al. |

(Continued)

Primary Examiner — Charles Tseng

(57) ABSTRACT

An example method performed by a processing system includes receiving a request from a first user to render an extended reality environment, wherein the request includes a definition of a first policy that governs user behavior within the extended reality environment, rendering the extended reality environment by presenting content contributed by at least one user in the extended reality environment, monitoring the extended reality environment to ensure that the rendering results in a compliance of the extended reality environment with the first policy, detecting that a portion of the content contributed by at least one other user of the extended reality environment results in the extended reality environment failing to comply with the first policy, and modifying a presentation of the portion of content in the extended reality environment in response to the detecting, wherein the modifying results in the compliance of the extended reality environment with the first policy.

20 Claims, 4 Drawing Sheets

(56) References Cited

U.S. PATENT DOCUMENTS

| | | |
|---|---|---|
| 2019/0188890 A1 | 6/2019 | Bastide et al. |
| 2020/0066045 A1 | 2/2020 | Stahl et al. |
| 2020/0167995 A1 | 5/2020 | Hare et al. |

POLICY DEFINITION AND ENFORCEMENT FOR EXTENDED REALITY MEDIA SESSIONS

This application is a continuation of U.S. patent application Ser. No. 16/937,675, filed Jul. 24, 2020, now U.S. Pat. No. 11,494,951, which is herein incorporated by reference in its entirety.

The present disclosure relates generally to audiovisual media, and relates more particularly to devices, non-transitory computer-readable media, and methods for defining and enforcing policies in extended reality media sessions for single and/or multiple users.

BACKGROUND

Extended reality (XR) is an umbrella term for technologies that include real-and-virtual combined environments (e.g., virtual reality, augmented reality, mixed reality, etc.) and human-machine interactions generated by computer technology and wearables. The various forms of XR can be used to make different types of media sessions, including gaming, video calling, film viewing, and the like, more immersive and/or more personalized.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
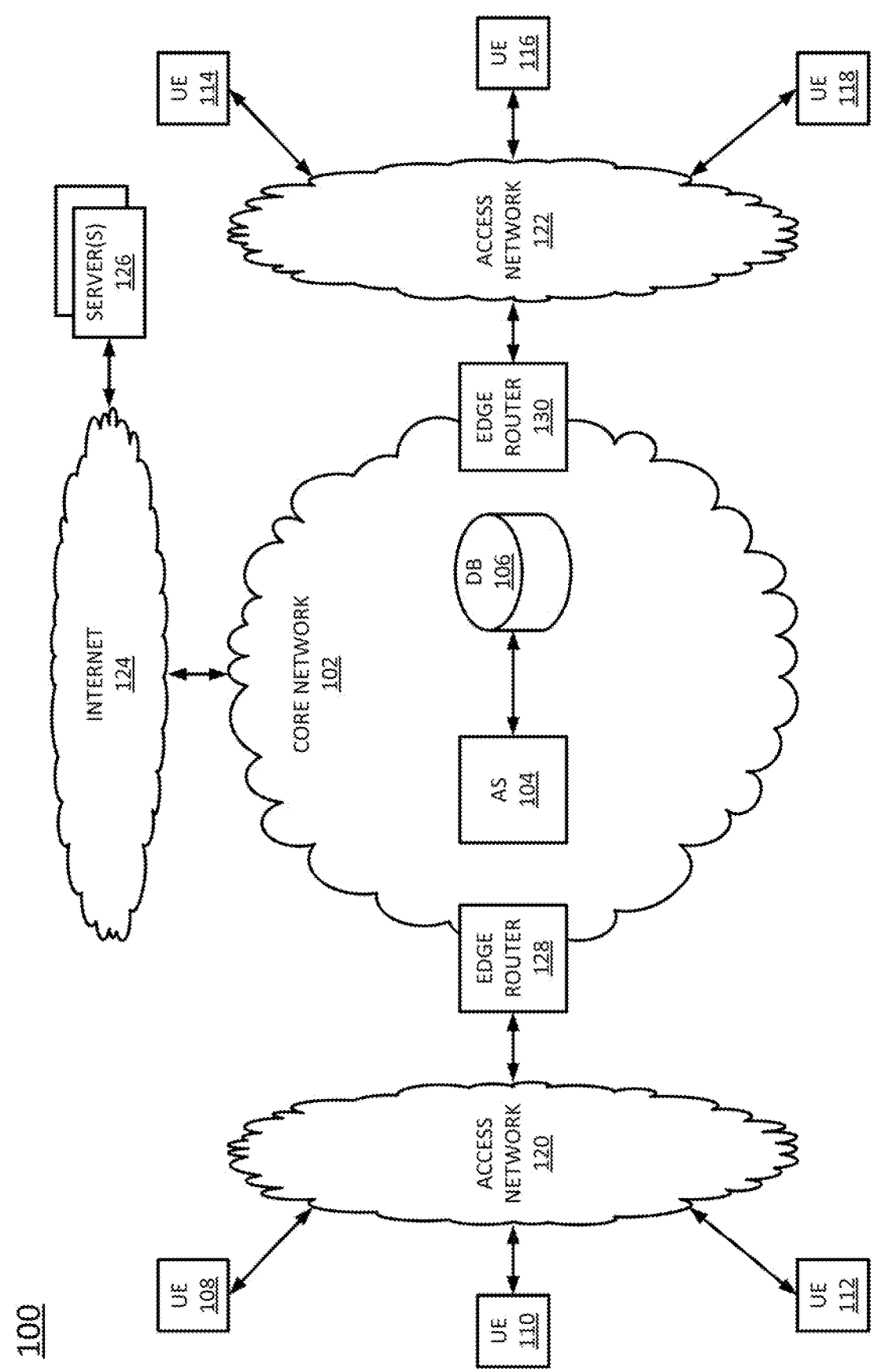
FIG. 1 illustrates an example system in which examples of the present disclosure for defining and enforcing policies in extended reality media sessions may operate.

The present disclosure broadly discloses methods, computer-readable media, and systems for defining and enforcing policies in extended reality media sessions for single and/or multiple users. In one example, a method performed by a processing system includes receiving a first request from a first user to render an extended reality environment, wherein the first request includes a definition of a first policy that governs user behavior within the extended reality environment, rendering the extended reality environment by presenting content contributed by at least one user in the extended reality environment, monitoring the extended reality environment to ensure that the rendering results in a compliance of the extended reality environment with the first policy, detecting that a portion of the content contributed by at least one other user of the extended reality environment results in the extended reality environment failing to comply with the first policy, and modifying a presentation of the portion of the content in the extended reality environment in response to the detecting, wherein the modifying results in the compliance of the extended reality environment with the first policy.

In another example, a non-transitory computer-readable medium may store instructions which, when executed by a processing system in a communications network, cause the processing system to perform operations. The operations may include receiving a first request from a first user to render an extended reality environment, wherein the first request includes a definition of a first policy that governs user behavior within the extended reality environment, rendering the extended reality environment by presenting content contributed by at least one user in the extended reality environment, monitoring the extended reality environment to ensure that the rendering results in a compliance of the extended reality environment with the first policy, detecting that a portion of the content contributed by at least one other user of the extended reality environment results in the extended reality environment failing to comply with the first policy, and modifying a presentation of the portion of the content in the extended reality environment in response to the detecting, wherein the modifying results in the compliance of the extended reality environment with the first policy.

In another example, a device may include a processing system including at least one processor and a non-transitory computer-readable medium storing instructions which, when executed by the processing system when deployed in a communications network, cause the processing system to perform operations. The operations may include receiving a first request from a first user to render an extended reality environment, wherein the first request includes a definition of a first policy that governs user behavior within the extended reality environment, rendering the extended reality environment by presenting content contributed by at least one user in the extended reality environment, monitoring the extended reality environment to ensure that the rendering results in a compliance of the extended reality environment with the first policy, detecting that a portion of the content contributed by at least one other user of the extended reality environment results in the extended reality environment failing to comply with the first policy, and modifying a presentation of the portion of the content in the extended reality environment in response to the detecting, wherein the modifying results in the compliance of the extended reality environment with the first policy.

As discussed above, various forms of extended reality (XR) technology can be used to make different types of media sessions, including gaming, video calling, film viewing, and the like, more immersive and/or more personalized. As an example, a virtual meeting application may allow users who connect to an XR virtual meeting session to present personalized avatars, backgrounds, filters, objects, and/or other representations to the other users in the session.

However, as the use of these types of applications becomes more commonplace across a wider variety of domains and among a larger number of users, it may become more difficult to ensure that the various user personalizations do not run afoul of any relevant policies. For instance, when using a virtual meeting application in a professional setting, a business may set a code of conduct that forbids the use of avatars that do not resemble the users (e.g., no use of avatars that resemble characters from films, television shows, or the like). However, in a purely social setting, more whimsical avatars may be acceptable. Similarly, in a professional setting, a business may wish to prevent users from displaying content related to confidential information (e.g., images of device prototypes, characters whose existence is being kept secret, movie script pages, etc.). In social settings, parents may wish to block the user of certain content (e.g., images, language, etc.) that may be deemed inappropriate for their children.

Examples of the present disclosure provide a solution for content and behavioral enforcement in an extended reality environment that negotiates the best solution and/or restricts users who violate defined policies before joining the extended reality environment. Examples of the present disclosure may automatically mediate integration of extended reality environments with security platforms so that the individuals, behaviors, objects, and the like that are presented in the extended reality environment are consistent with any policies which may be defined by the host and/or users of the extended reality environment. In some examples, the present disclosure may modify the presentation of the extended reality environment (e.g., more specifically, may modify the presentation of content contributed by users of the extended reality environment) in order to ensure consistency with the policies. For instance, content that is not consistent with the policies may be blocked (e.g., not rendered), may be rendered in an altered form (e.g., blurred or covered over with a blank box), or may be replaced with default content (e.g., a generic avatar or placeholder).

In one example, the present disclosure may modify the presentation of content contributed by users of an extended reality environment in order to produce a global (or universal) extended reality environment that is consistent with policies set by the extended reality environment's host or that satisfies a maximal number of policies requested by the users of the extended reality environment. The global extended reality environment may comprise a rendering of an extended reality environment that is presented (at least as a default) to every user of the extended reality environment (i.e., the modifications may be presented to all users). However, the present disclosure may also allow an individual user of the extended reality environment to further modify the individual user's local rendering of the extended reality environment (e.g., a version of the extended reality environment that is presented exclusively to the individual user) to conform to the individual user's preferences. In this case, the further modifications made to conform to the individual user's preferences may not be presented to the other users of the extended reality environment.

In other words, a global rendering of an XR environment may be rendered for all users, where the global rendering may modify content presented in the XR environment at the group level to conform to a first set of policies. The content presented in the global rendering may be further modified at the individual user level to produce a local rendering of the XR environment, where the local rendering may modify the content presented in the XR environment to additionally conform to a second set of policies. The local rendering of the XR environment may vary from user to user. These and other aspects of the present disclosure are discussed in greater detail below in connection with the examples of FIGS. 1-4.

To further aid in understanding the present disclosure, FIG. 1 illustrates an example system 100 in which examples of the present disclosure for defining and enforcing policies in extended reality media sessions may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108, 110, and 112. Similarly, the access network 122 may be in communication with one or more user endpoint devices 114, 116, and 118. The access networks 120 and 122 may transmit and receive communications between the user endpoint devices 108-118, between the user endpoint devices 108-118, the server(s) 126, the AS 104, other components of the core network 102, devices reachable via the Internet in general, and so forth. In one example, each of the user endpoint devices 108-118 may comprise any single device or combination of devices that may comprise a user endpoint device. For example, the user endpoint devices 108-118 may each comprise a mobile device, a cellular smart phone, a gaming console, a set top box, a laptop computer, a tablet computer, a desktop computer, an application server, a bank or cluster of such devices, and the like. In one example, at least some of the user endpoint devices 108-118 may comprise devices specifically configured to render immersive and/or extended reality content, such as head mounted displays, three-dimensional televisions, and the like.

In one example, one or more servers 126 may be accessible to user endpoint devices 108-118 via the Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for defining and enforcing policies in extended reality media sessions, as described herein. For instance, the AS 104 may be configured to operate as a Web portal or interface via which a user endpoint device, such as any of the UEs 108-118, may access an application that renders single-user and multiple-user XR environments according to user defined policies.

Figure 4:
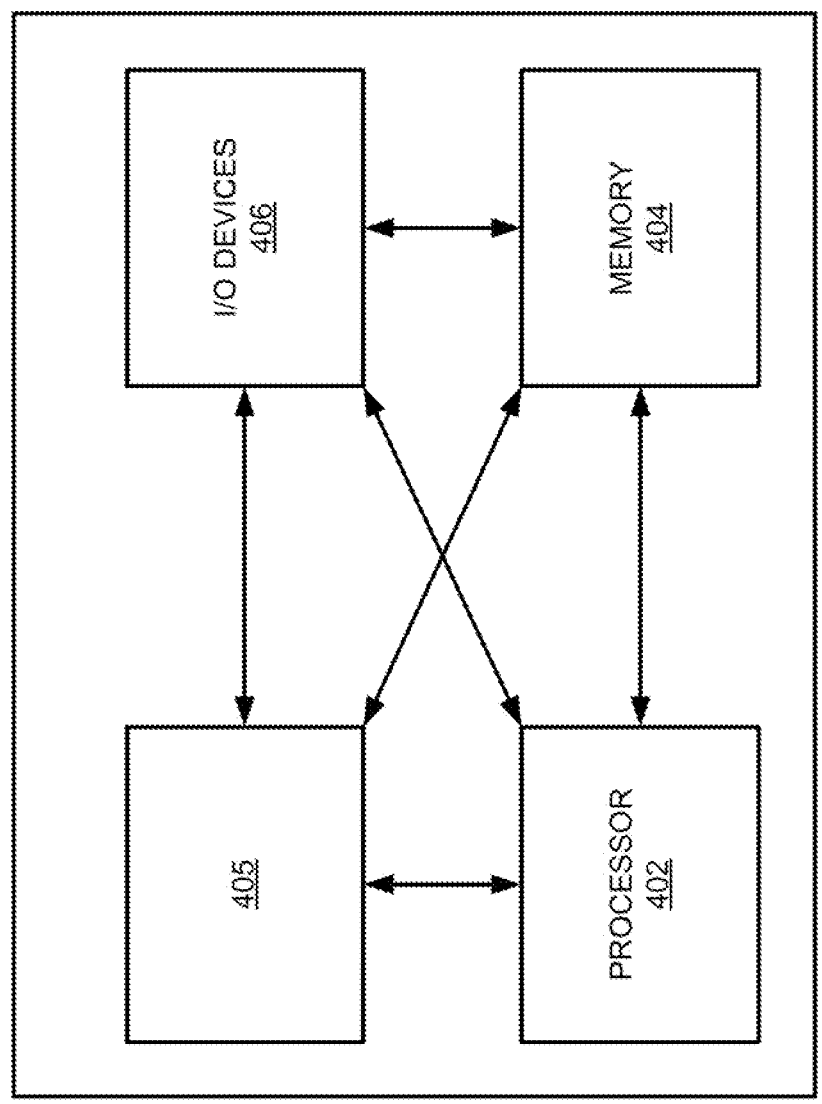
FIG. 4 illustrates an example of a computing device, or computing system, specifically programmed to perform the steps, functions, blocks, and/or operations described herein.

To this end, the AS 104 may comprise one or more physical devices, e.g., one or more computing systems or servers, such as computing system 400 depicted in FIG. 4, and may be configured as described above. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

For instance, in one example, the AS 104 may render XR environments for immersive applications such as gaming applications, video calling or virtual meeting applications, film viewing applications, and the like. In one example, rendering of the XR environment by the AS 104 may comprise rendering one or more digital objects for insertion into simulated or real surroundings. For instance, the AS 104 may render the digital objects as one or more overlays that, when superimposed over an image of real world surroundings, give a viewer the impression that the digital objects are actually present in the real world surroundings.

In one example, the AS 104 may render a digital object based on a user request and on at least one policy that governs user behavior in the XR environment. For instance, a user of the XR environment may contribute some content to the XR environment, such as a personal avatar, an image or video or himself or herself, an emoji, or another type of content. However, a policy associated with the XR environment (which may be defined by a host, an administrator, or the like) may impose certain restrictions on the types of content that the users of the XR environment may contribute to the XR environment. For instance, if the XR environment is part of a virtual meeting application, a host of the XR environment may define a policy that requires that all user avatars contributed by users of the XR environment comprise images of the users in professional attire. Thus, the AS 104 may analyze the avatars of the users of the XR environment and may, as part of rendering the avatars for the XR environment, modify (potentially with the permission of the corresponding user(s)) any avatars that do not comply with the policy. For instance, the AS 104 may blur an avatar, cover an avatar with a blank box, replace the avatar with a generic avatar or placeholder, or ask the corresponding user to submit a new avatar. Thus, the AS 104 may render an XR environment for presentation to all users, where the XR environment complies with any policies that apply globally to the XR environment.

In further examples, the AS 104 may further render the XR environment based on one or more user-specific (e.g., non-global) policies, to produce a local XR environment for a particular user. For instance, the AS 104 may ensure that the avatars presented in an XR environment all comprise images of the users in professional attire, as discussed above. This policy governing the appearance of avatars may be applied to the XR environment as it is presented to all users. In other words, all users of the XR environment may be presented with an XR environment in which all user avatars comprise images of the users in professional attire. However, one user of the XR environment may further define a policy for his own local XR environment which blocks content that the user deems objectionable (e.g., violent imagery, strong language, etc.). In this case, the AS 104 may further render the local XR environment for that user in a manner that removes the objectionable content (e.g., blurring a violent or gory image on a document presented by another user).

The AS 104 may have access to at least one database (DB) 106, where the DB 106 may store profiles for users of applications that employ XR environments. For instance, a user profile in this case may include user-specific content that the user may contribute to an XR environment (e.g., one or more avatars, images, or the like). A user profile may also define one or more user-specific policies to be considered when rendering an XR environment (e.g., a local XR environment) for the user. In one example, DB 106 may comprise a physical storage device integrated with the AS 104 (e.g., a database server or a file server), or attached or coupled to the AS 104, to items of content, profiles, and/or synthesized content, in accordance with the present disclosure. In one example, the AS 104 may load instructions into a memory, or one or more distributed memory units, and execute the instructions for ensuring consistent generation of media elements across various media, as described herein. An example method for defining and enforcing policies in extended reality media sessions is described in greater detail below in connection with FIGS. 2-3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108-118 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
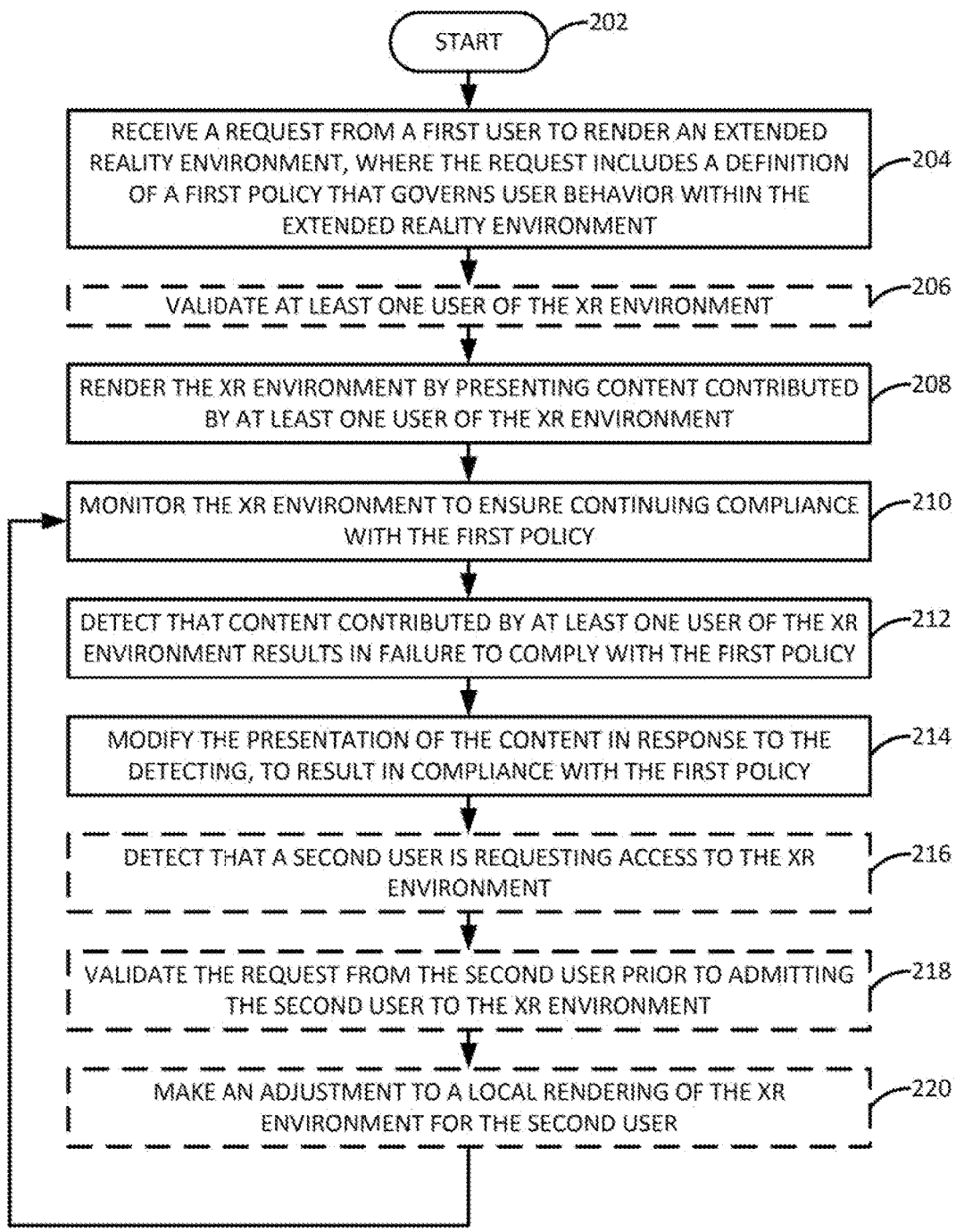
FIG. 2 illustrates a flowchart of an example method for defining and enforcing policies in extended reality media sessions for single and/or multiple users, in accordance with the present disclosure.

FIG. 2 illustrates a flowchart of an example method 200 for defining and enforcing policies in extended reality media sessions for single and/or multiple users, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may receive a request from a first user to render an extended reality (XR) environment, where the request includes a definition of a first policy that governs user behavior within the XR environment. The XR environment may comprise a part of a gaming experience, a video calling experience (e.g., a virtual meeting), a film viewing experience, or another type of multimedia experience. In one example, the first user may be a host of the XR environment or the experience of which the XR environment is a part.

In one example, the first policy may restrict the nature of visual content that a user may contribute to the XR environment. For instance, the first policy may restrict the nature of an avatar or other virtual representation that a user may use to represent himself or herself in a virtual meeting. As an example, if the purpose of the virtual meeting is professional in nature, then the first user may prefer that attendees of the virtual meeting use avatars that have a more professional look and feel (e.g., a photo of an attendee in business attire versus an image of a cartoon character, a photo using an image filter, or a photo superimposed over a simulated background). Similarly, if the virtual meeting is a call between two businesses, then the first user may prefer that the attendees associated with the first user's business present some sort of unified image (e.g., all attendees associated with the first user's business use an avatar that is wearing a company shirt, hat, or uniform, or an avatar that is posed in front of the company logo).

On the other hand, if the purpose of the virtual meeting is social in nature, such as a video call among family, then the first user may allow for the use of more whimsical or individualized avatars, but may limit the imagery to content that is appropriate for the youngest attendees of the call (e.g., no violent images or objectionable language on clothing, no objectionable hand gestures, etc.).

In another example, if the purpose of the virtual meeting is professional in nature, then the first user may wish to ensure that certain proprietary professional information is not inadvertently made visible to unauthorized individuals. For instance, the virtual meeting may comprise a video call between representatives of two businesses. One of the businesses may wish to ensure that no documents (e.g., text documents, schematics, photos, film scripts, or the like) or other objects (e.g., prototypes, models, or the like) depicting confidential information are visible to the representatives of the other business.

In a further example, the first policy may restrict the nature of audible content that a user may contribute to the XR environment. For instance, if the purpose of a virtual meeting is professional in nature, then the first user may not want attendees to utilize sound effects, music, or other forms of audio media other than the attendees' own voices. In another example where the purpose of a virtual meeting is social in nature, the first user may not want audio having a content rating above a specified threshold to be usable by the attendees, in case children are present (e.g., no music labeled with a parental advisory label).

In a further example, the first policy may not define content that is acceptable or unacceptable in the XR environment, but may instead define the minimum capabilities of the devices that are permitted to access the XR environment. For instance, the first policy may require that the link between the processing system and any device attempting to access the XR environment must have at least a minimum bandwidth, or that any device attempting to access the XR environment must be capable of presenting the XR environment with at least a minimum image resolution.

In one example, the first policy may be defined explicitly in the request to render the XR environment. For instance, the first user may submit the request via a graphical user interface that includes a menu, where the first user may check or uncheck boxes on the menu next to policies that the first user does or does not want implemented. In another example, the graphical user interface may present a menu that includes categories of XR environments (e.g., "professional," "social," "kid-friendly," etc.), where each category is associated with a set of pre-selected policies. For instance, selecting the "professional" category may automatically implement a set of policies that restricts the nature of avatars used by users and limits the types of audio that users may introduce into the XR environment.

In another example, the first policy may be defined implicitly in the request to render the XR environment, e.g., via a profile used to make the request. For instance, the first user may have a plurality of profiles through which he or she may request rendering of an XR environment. One profile may be used for professional purposes, another profile may be used for social purposes, and so on. Each profile may therefore have a pre-selected set of policies associated with the profile. Thus, simply by sending the request via a specific profile, the first user may implicitly request that certain policies be implemented in the rendering of the XR environment.

In optional step 206 (illustrated in phantom), the processing system may validate at least one user of the XR environment. In one example, the XR environment may be rendered for a single user, e.g., the first user. For instance, a single user may wish to have the XR environment rendered as part of a gaming or film viewing experience. In another example, however, the XR environment may be rendered for multiple users, e.g., including the first user. For instance, multiple users may wish to share a group experience, such as a virtual meeting, a multi-player gaming experience, or the like.

In one example, each user of the XR environment may be validated by checking a profile associated with the user. For instance, each user may have an associated profile that specifies information including at least one of: a physical context of the user (e.g., the location and/or technological capabilities of the location from which the user is participating in the XR environment, such as a public or private location, access to Internet of Things devices, etc.), the resource context of the user (e.g., the capabilities of the device(s) via which the user is participating in the XR environment, such as computing capabilities, data capture capabilities, rendering capabilities, and available XR inputs such as physical tactile response range), historical preferences of the user (e.g., preferred avatars to use during certain social contexts or certain times of day), a security or authentication clearance of the user (e.g., whether the user is authorized to participate in certain types of XR environments), types of external devices from which the user may receive alerts or notifications, and/or additional policies requested by the user that relate to the rendering of the XR environment.

For instance, in one example, the first user may define a set of policies governing the behavior of users of the XR environment, as discussed above. The set of policies requested by the first user may be applied universally to the XR environment experienced by all users. For instance, if a policy defined by the first user specifies that only professional images may be used as avatars, then every user of the XR environment may be presented with "professional" looking avatars of the other users. However, an individual user may also request that further policies be defined for the XR environment that is presented to him or her only, as discussed in further detail below. For instance, the user may request that his or her own avatar be presented, on his or her own device only, as a cartoon character.

In step 208, the processing system may render the XR environment by presenting content contributed by at least one user of the XR environment. In one example, rendering of the XR environment may include modifying the content (e.g., a portion of the content) presented by at least one user of the XR environment. The modifying may include modifying the appearance of a visual component of the content, modifying the sound of an audible component of the content, and/or modifying another component of the content. For instance, if the first policy requires the use of avatar images of the users in professional attire, and the avatar contributed by a given user is an image of a cartoon character, then the processing system may replace the given user's avatar with a default image (e.g., a blank box, the given user's name, a generic human avatar, etc.).

In another example, modifying the content (e.g., a portion of the content) may include requesting that a given user of the XR environment alter the content that the given user is contributing. For instance, considering the same example above in which the user's avatar is an image of a cartoon character, the processing system may send a message to the given user requesting that the given user change his or her avatar to an image of the given user in professional attire.

In another example, modifying the content (e.g., a portion of the content) may include querying a user of the XR environment about unknown objects detected by the processing system and altering the content based on the user's response to the querying. In one example, the unknown objects may include unknown objects in the content contributed by the user. For instance, the processing system may detect a photo or a white board in a video stream of a given user and may ask the given user whether the photo or white board should be obscured (e.g., blurred, covered by a blank box, etc.) in the XR environment. In another example, the unknown objects may include additional connected devices in a given user's vicinity (e.g., Internet or Things devices) that may be used to transmit content to the XR environment and/or receive content from the XR environment.

In step 210, the processing system may monitor the XR environment to ensure continuing compliance of the XR environment with the first policy. For instance, the processing system may observe the content contributed to the XR environment by the users (e.g., the interactions between the users of the XR environment and/or the media contributed by the users). In one example, any content that a user wishes to contribute to the XR environment may first be submitted to the processing system, which may be tasked with rendering and presenting the content as part of the XR environment. Thus, this may give the processing system the opportunity to evaluate and/or modify the content (e.g., a portion of the content) to ensure compliance with the first policy.

In step 212, the processing system may detect that content (e.g., a portion of the content) contributed by at least one user of the XR environment results in a failure of the XR environment to comply with the first policy. For instance, a document that a user is trying to present via a screen share, or a photo that is visible in the background of a user's image, may contain information that is confidential or language that is considered offensive. The processing system may utilize any one or more of a number of techniques in order to analyze content for compliance with the first policy, including optical character recognition, text analysis, keyword detection, object recognition, facial recognition, voice recognition, and/or other techniques against a repository of known words or phrases, images, objects, videos, audios, and the like. Words, objects, images, or the like that are detected in the content may then be compared against the first policy in order to determine whether the words, objects, images, or the like can be presented in the XR environment without violating the first policy.

In step 214, the processing system may modify a presentation of the content (e.g., the portion of the content that results in the failure of the XR environment to comply with the first policy) in the XR environment in response to the detecting, wherein the modifying results in the compliance of the XR environment with the first policy. More specifically, the processing system may modify, within the XR environment, the presentation of the content that results in the failure to comply with the first policy (i.e., so that the content as modified results in compliance of the XR environment with the first policy). For instance, the content (e.g., a portion of the content) may be blocked (e.g., not rendered or presented), may be rendered and presented in an altered form (e.g., blurred or covered over with a blank box), or may be replaced with default content (e.g., a generic avatar or placeholder). In one example, the processing system may notify the user who contributed the content that the rendering of the content is to be modified when presented in the XR environment.

In optional step 216 (illustrated in phantom), the processing system may detect that a second user is requesting access to the XR environment. For instance, the processing system may receive a request from the second user requesting access to the XR environment. The request may include, for example, a user name associated with the second user, an email address associated with the second user, an identifier (e.g., a numerical identifier) uniquely identifying the XR environment, and/or a password for accessing the XR environment.

In optional step 218 (illustrated in phantom), the processing system may validate the request from the second user prior to admitting the second user to the XR environment. In one example, validating the request from the second user may comprise verifying that presentation of any content that the second user is expected to contribute to the XR environment will not result in failure of the XR environment with the first policy. For instance, if the first policy restricts the types of avatars that users of the XR environment may present, then the processing system may verify that the second user's avatar complies with the restrictions. In a further example, where the content (e.g., a portion of the content) that the second user is expected to contribute to the XR environment would result in failure of the XR environment to comply with the first policy, the processing system may present a dialog or message to the second user to give the second user an opportunity to modify the content for compliance. For instance, referring again to the avatar example, the processing system may present the second user with a message indicating why the avatar is not compliant with the policy (e.g., "All users are required to present an avatar comprising a photo in business attire"). The processing system may propose an alternative to the non-compliant content (e.g., a generic avatar in place of the non-compliant avatar) or may ask the second user if he or she wants to resubmit the request with a new version of the content.

Figure 3:
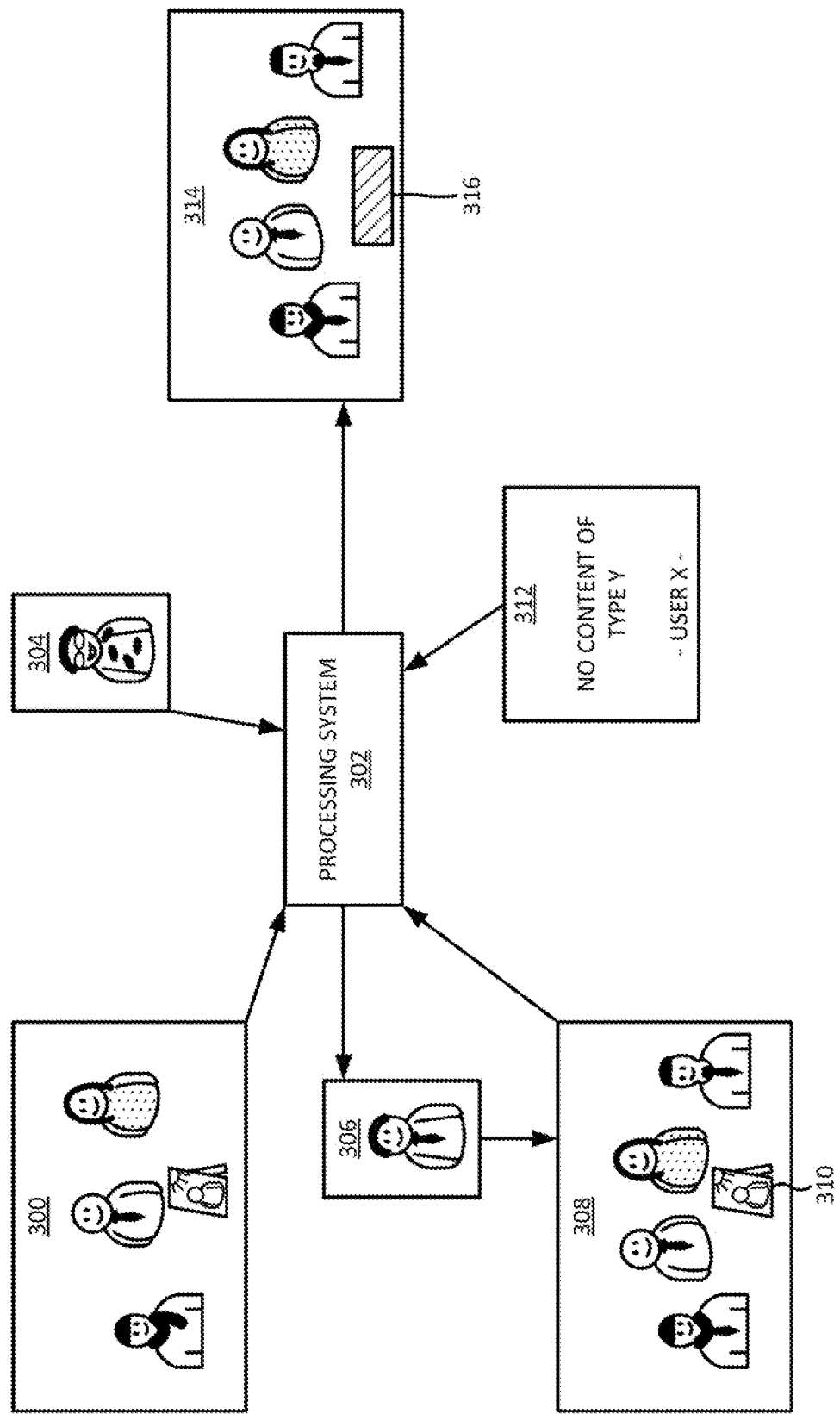
FIG. 3 illustrates an example extended reality environment that may be modified by a processing system upon validation of a new user (e.g., a second user), according to examples of the present disclosure.

FIG. 3 illustrates an example XR environment 300 that may be modified by a processing system 302 upon validation of a new user (e.g., a second user), according to examples of the present disclosure. In the example illustrated in FIG. 3, the first policy may require all users of the XR environment 300 to use avatars that comprise images of themselves in professional attire. However, the second user may attempt to join the XR environment 300 using an avatar 304 that comprises a vacation image of the second user. Thus, validation of the second user in this example may involve modifying the second user's avatar, e.g., by requesting that the second user provide a new avatar 306 that conforms to the first policy. The processing system 302 may then modify the XR environment 300 by presenting the new avatar 306 in the XR environment 300 to render a modified XR environment 308.

Referring back to FIG. 2, in optional step 220 (illustrated in phantom), the processing system may make an adjustment to a local rendering of the XR environment for the second user. In one example, the processing system may not make the same adjustment to the universal rendering of the XR environment (i.e., the XR environment that is rendered for all users of the XR environment). In other words, the adjustment made in step 220 may be presented only to the second user, and not to the other users of the XR environment.

In one example, the adjustment may be made in response to a physical context of the second user. For instance, in one example, the adjustment may improve a presentation of the XR environment for a second user depending on a physical activity in which the second user is engaged while accessing the extended reality environment (e.g., whether the second user is standing, sitting, running, or the like). For instance, if the XR environment is rendered as part of a gaming application, and the second user is sitting on the ground, the field of view of the local XR environment may be lowered relative to the field of view of the universal XR environment to account for the second user's vantage point. In another example, the adjustment may compensate for the boundaries of the physical space in which the second user is experiencing the XR environment. For instance, if the XR environment is rendered as part of a gaming application, then the location of a digital object in the XR environment may be adjusted, in the second user's local rendering only, to prevent conflict of the digital object with an object or obstacle in the physical space. However, the location of the digital object may be unaltered for other users of the XR environment for whom there are no conflicts with the physical spaces.

In another example the adjustment may be made in response to a second, user-specific policy that is defined by the second user. The second policy may be defined, for example, in the request received from the second user or in a profile for the second user that is accessible to the processing system. For instance, the second user may be a minor who is using a virtual meeting application, and the second user's parents may specify in a profile for the second user that any XR environment presented to the second user should not contain violent or objectionable imagery or language. Thus, if an objectionable word is printed on the shirt of an avatar contributed by another user of the virtual meeting, the processing system may blur, block, or otherwise obscure the offensive word in the second user's local rendering of the XR environment only. However, the objectionable word may still be visible to other users of the XR environment who have not requested removal of offensive language.

Referring again to FIG. 3, the modified XR environment 300 may include an image of a framed photo 310 on a user's desk. However, the second user may define a second policy 312 that indicates that the second user does not want to be presented with content of a certain nature, and the processing system 302 may detect that the framed photo 312 contains content of that certain nature. In this case, the processing system 302 may modify a local rendering 314 of the modified XR environment to obscure the framed photo 310 (e.g., with a blank box 316). The local rendering 314 may only be presented to the second user; i.e., the framed photo may be visible to the other users in the other users' respective local renderings of the modified XR environment 308.

The method 200 may return to step 210 and may continue to monitor the XR environment as discussed above. Thus, the method 200 may iterate through one or more of steps 210-220 any number of times, for as long as the XR environment persists. In one example, the method 200 may end when a signal is received from the host to cease rendering the XR environment.

It should be noted that although the discussion of the method 200 describes examples in which the rendering of visible content may be modified to comply with a policy defined for an XR environment, the policy and the modification could equally apply to other, non-visible types of content. For instance, the processing system could modify audible content by blocking the content, adding noise, bleeping out segments of the audio signal, or the like. In another example, the processing system could modify tactile feedback content by blocking the content or adjusting the intensity or frequency of a rumble of a game controller.

Moreover, the policies applied to an XR environment may change dynamically over time, even within the same XR environment or session. For instance, a user may define a policy that removes any content including violent imagery or string language when the user's children are present. However, if the user's children are no longer present (e.g., the children leave the room in which the user is experiencing the XR environment), then the policy may be disabled or redefined for the remainder of the time that the user is experiencing the XR environment.

It should be further noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for defining and enforcing policies in extended reality media sessions, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for defining and enforcing policies in extended reality media sessions (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for defining and enforcing policies in extended reality media sessions (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, by a processing system including at least one processor, a first request to render an extended reality environment for a plurality of users, wherein the first request includes a definition of a first policy that governs a behavior of the plurality of users within the extended reality environment;
   rendering, by the processing system, the extended reality environment by presenting extended reality content contributed by a first user of the plurality of users in the extended reality environment;
   monitoring, by the processing system, the extended reality environment to ensure that the rendering results in a compliance of the extended reality environment with the first policy;
   detecting, by the processing system, that a portion of the extended reality content contributed by other a second user of the plurality of users results in the extended reality environment failing to comply with the first policy; and modifying, by the processing system, a presentation of the portion of the extended reality content in the extended reality environment in response to the detecting, wherein the modifying results in the compliance of the extended reality environment with the first policy, wherein the modifying comprises:
  detecting, by the processing system, an unknown object in the portion of the extended reality content;
  querying, by the processing system, the second user about the unknown object; and
  altering, by the processing system, the portion of the extended reality content based on a response of the second user to the querying.

2. The method of claim 1, wherein the first policy restricts a nature of visual content of the extended reality content that the second user is permitted to contribute to the extended reality environment.

3. The method of claim 2, wherein the modifying comprises modifying an appearance of the portion of the extended reality content.

4. The method of claim 1, wherein the first policy restricts a nature of audible content of the extended reality content that the second user is permitted to contribute to the extended reality environment.

5. The method of claim 4, wherein the modifying comprises modifying a sound of the portion of the extended reality content.

6. The method of claim 1, wherein the first policy defines a minimum capability of a device that is used to access the extended reality environment.

7. The method of claim 1, wherein the first policy is defined explicitly in the first request.

8. The method of claim 1, wherein the first policy is defined implicitly in a profile of a user from whom the first request is received.

9. The method of claim 1, wherein the modifying comprises at least one of: blocking the portion of the extended reality content or replacing the portion of the extended reality content with default content.

10. The method of claim 1, wherein the modifying comprises presenting the portion of the extended reality content in an altered form.

11. The method of claim 1, further comprising:
  detecting, by the processing system, a second request from a third user requesting access to the extended reality environment;
  validating, by the processing system, the second request from the third user in response to the second request; and
  admitting, by the processing system, the third user to the extended reality environment subsequent to the validating so that the third user becomes one of the plurality of users.

12. The method of claim 11, further comprising:
  making, by the processing system, an adjustment to a local rendering of the extended reality environment that is presented to the third user without making the adjustment to local renderings of the extended reality environment that are presented to other users of the plurality of users excluding the third user.

13. The method of claim 12, wherein the adjustment is made in response to a second policy that is defined by the third user.

14. The method of claim 13, wherein the adjustment comprises a further modification to the presentation of the extended reality content in the extended reality environment, wherein the further modification results in a compliance of the extended reality environment with the second policy.

15. The method of claim 12, wherein the adjustment is made in response to a physical context of the third user.

16. The method of claim 15, wherein the physical context comprises a nature of a physical activity in which the third user is engaged while accessing the extended reality environment.

17. The method of claim 12, wherein the adjustment comprises presenting a second portion of the extended reality content contributed by the third user in the local rendering of the extended reality environment that is presented to the third user, without presenting the second portion of the extended reality content contributed by the third user in the local renderings of the extended reality environment that are presented to the other users of the plurality of users excluding the third user.

18. The method of claim 1, wherein the unknown object comprises a connected device in a vicinity of the second user that is capable of at least one of: transmitting content to the extended reality environment and receiving content from the extended reality environment.

19. A non-transitory computer-readable medium storing instructions which, when executed by a processing system including at least one processor, cause the processing system to perform operations, the operations comprising:
  receiving a first request to render an extended reality environment for a plurality of users, wherein the first request includes a definition of a first policy that governs a behavior of the plurality of users within the extended reality environment;
  rendering the extended reality environment by presenting extended reality content contributed by a first user of the plurality of users in the extended reality environment;
  monitoring the extended reality environment to ensure that the rendering results in a compliance of the extended reality environment with the first policy;
  detecting that a portion of the extended reality content contributed by a second user of the plurality of users results in the extended reality environment failing to comply with the first policy; and
  modifying a presentation of the portion of the extended reality content in the extended reality environment in response to the detecting, wherein the modifying results in the compliance of the extended reality environment with the first policy, wherein the modifying comprises:
  detecting an unknown object in the portion of the extended reality content;
  querying the second user about the unknown object; and
  altering the portion of the extended reality content based on a response of the second user to the querying.

20. A device comprising:
  a processing system including at least one processor; and
  a non-transitory computer-readable medium storing instructions which, when executed by the processing system, cause the processing system to perform operations, the operations comprising:
    receiving a first request to render an extended reality environment for a plurality of users, wherein the first request includes a definition of a first policy that governs a behavior of the plurality of users within the extended reality environment;

rendering the extended reality environment by presenting extended reality content contributed by a first user of the plurality of users in the extended reality environment;

monitoring the extended reality environment to ensure that the rendering results in a compliance of the extended reality environment with the first policy;

detecting that a portion of the extended reality content contributed by a second user of the plurality of users results in the extended reality environment failing to comply with the first policy; and modifying a presentation of the portion of the extended reality content in the extended reality environment in response to the detecting, wherein the modifying results in the compliance of the extended reality environment with the first policy, wherein the modifying comprises:

detecting an unknown object in the portion of the extended reality content;

querying the second user about the unknown object; and altering the portion of the extended reality content based on a response of the second user to the querying.

* * * * *